United States Patent [19]

Kubota et al.

[11] 4,231,716
[45] Nov. 4, 1980

[54] MECHANICAL LUBRICATING PUMP

[75] Inventors: Kenichi Kubota; Osamu Mukai; Kenji Kariyama, all of Morioka, Japan

[73] Assignees: Tohoku Mikuni Kogyo Co., ltd., Takizawa; Mikuni Kogyo Co., Ltd., Tokyo, both of Japan

[21] Appl. No.: 926,619

[22] Filed: Jul. 21, 1978

[30] Foreign Application Priority Data

Feb. 27, 1978 [JP] Japan .............................. 53-24341[U]
Mar. 8, 1978 [JP] Japan .............................. 53-28523[U]

[51] Int. Cl.³ .................... F04B 19/02; F16N 13/22
[52] U.S. Cl. .................................. 417/315; 417/461; 417/500; 184/35
[58] Field of Search ................. 417/315, 461, 500; 184/27 R, 31, 33, 35

[56] References Cited

U.S. PATENT DOCUMENTS

| | | | |
|---|---|---|---|
| 1,279,480 | 9/1918 | Strand | 184/33 |
| 3,353,492 | 11/1967 | Heinzelmann | 417/461 |
| 4,036,326 | 7/1977 | Mukai et al. | 184/27 R |

FOREIGN PATENT DOCUMENTS

| | | | |
|---|---|---|---|
| 125539 | 11/1931 | Austria | 184/35 |
| 371442 | 3/1923 | Fed. Rep. of Germany | 184/33 |
| 498320 | 5/1930 | Fed. Rep. of Germany | 184/33 |

Primary Examiner—Leonard E. Smith
Attorney, Agent, or Firm—Stevens, Davis, Miller & Mosher

[57] ABSTRACT

A mechanical lubricating pump for supplying lubricating oil to rotary parts of machines and equipment. A rotatable distributor is inserted in the lengthwise direction of a pump body, and a suction port and a discharge port are provided in the diametrical direction of the body. A worm gear is disposed at one end of the distributor, while a plunger is inserted at the other end. Upon rotation of the distributor, the plunger executes relative movements in the axial direction, so that the pumping action is effected to suck and discharge the lubricating oil. The distributor has means by which the roles of the suction port and the discharge port at the time of the forward rotation of a driving source are maintained as they are when the driving source is reversely rotated. As a result, even when the driving source is brought from the forward rotation to the reverse rotation, the pumping action is continued, the positional relation between suction and discharge passages remains unchanged, and the discharge of the lubricating oil is carried out uninterruptedly.

2 Claims, 12 Drawing Figures

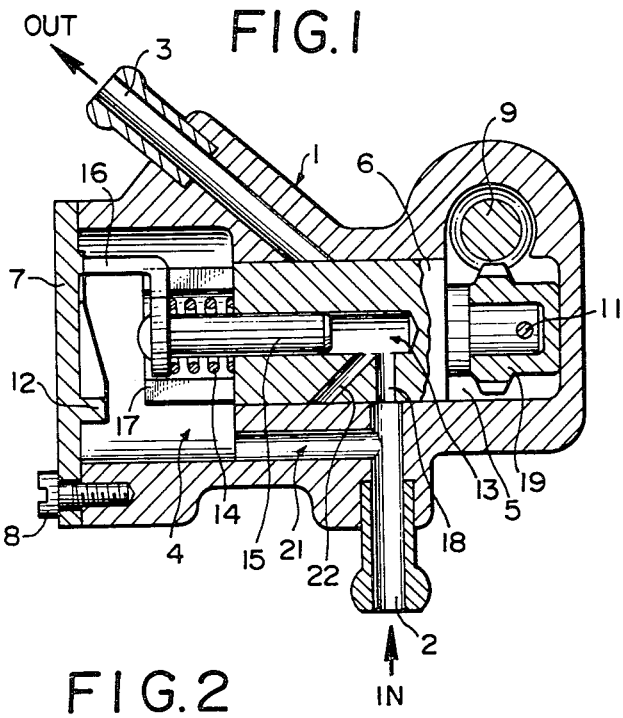
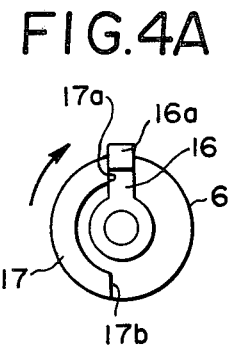
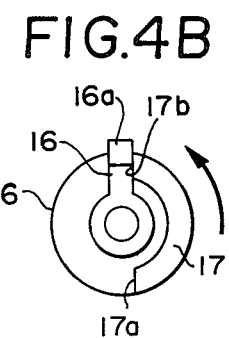
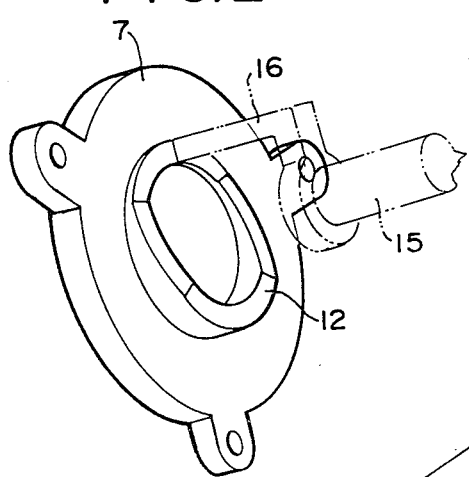
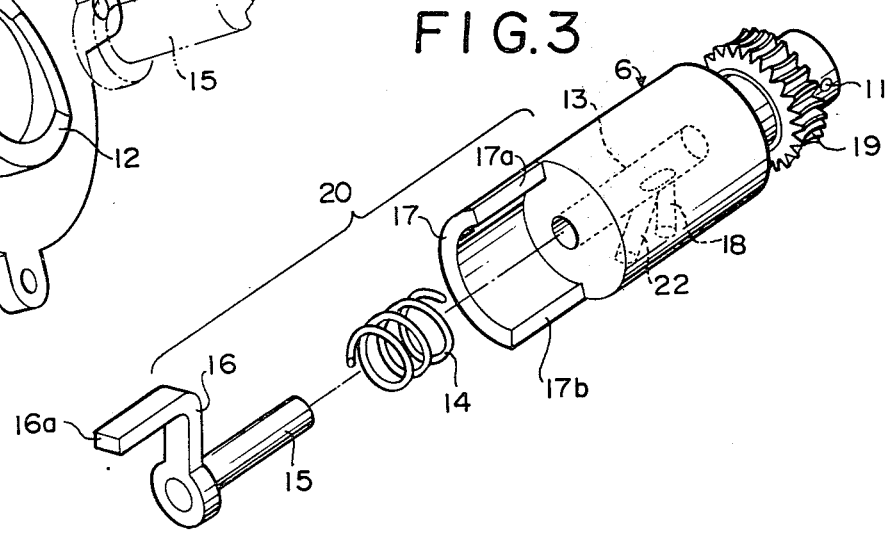

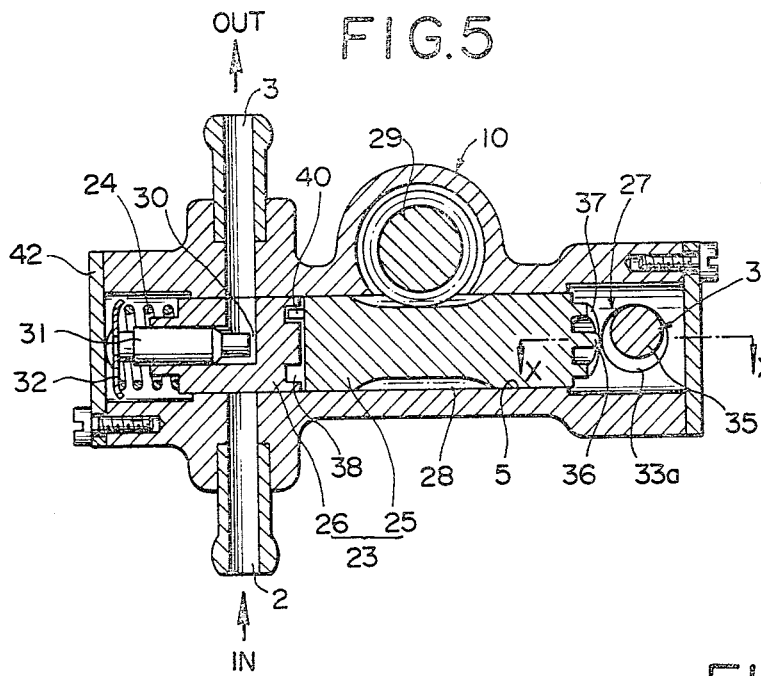
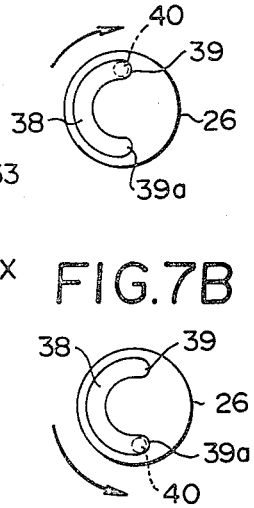
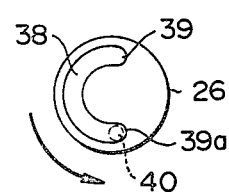
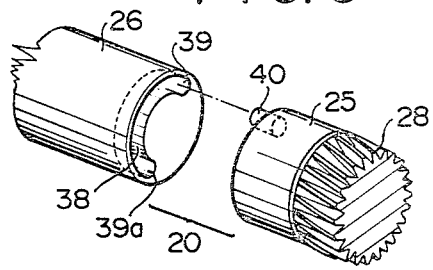
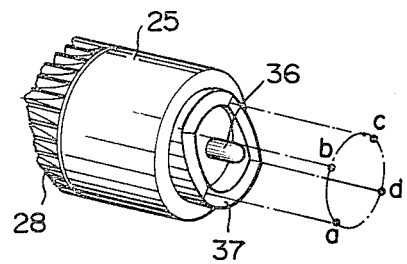
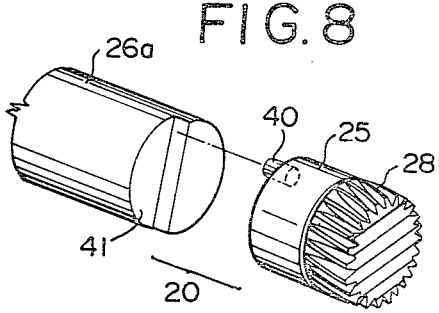
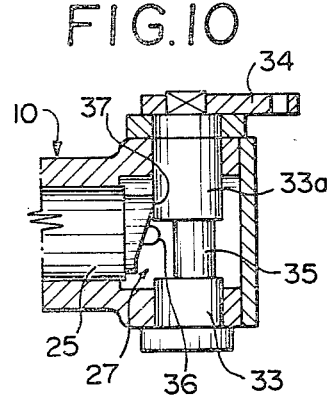

MECHANICAL LUBRICATING PUMP

This invention relates to a mechanical lubricating pump which supplies lubricating oil to bearings or sliding pairs of a prime mover or any other machine or equipment. More particularly, it relates to a mechanical lubricating pump in which, when an input shaft of the pump is rotated forwards or reversely, lubricating oil is sucked from a fixed inlet and discharged from a fixed outlet at all times irrespective of the rotating direction of the input shaft.

Mechanical lubricating pumps of the type wherein a plunger engaging a driving worm is endowed with rotation and reciprocating motion and both the ports of an inlet and an outlet are alternately opened and closed according to the operation of the plunger, thereby to suck and discharge lubricating oil, have been extensively used as lubricating oil feeders for the rotary parts of various machines and equipment. In the conventional lubricating pumps, however, when the rotating direction of the driving worm has changed from the forward direction to the reverse direction, the positions of suction and discharge are inverted and the discharge port at the time of the forward rotation becomes the suction port, which gives rise to inconveniences. By way of example, prime movers can rotate forwards and reversely in an electically-driven or engine-driven cart for use in a golf course, an ordinary electric automobile, etc. Regarding the lubricating pump carried on such a vehicle, it is feared that upon the reverse rotation of the prime mover, the discharge of the lubricating oil will not be effected, and a shaft portion seizing may seize up on account of the reverse rotation for a long time.

An object of this invention is to provide an improved mechanical lubricating pump.

Another object of this invention is to provide a mechanical lubricating pump in which, whether a driving shaft rotates forwards or reversely, the positions of suction and discharge remain unchanged, and the supply of lubricating oil is continuously effected.

Still another object of this invention is to provide a novel mechanical lubricating pump in which, when a driving shaft has changed from its forward rotation to its reverse rotation, a discharge pressure at the reverse rotation can continue to that at the forward rotation with a predetermined phase lag.

Other features and advantages of the invention will be apparent from the following description taken in connection with the accompanying drawing wherein:

FIG. 1 is an axial sectional view of a preferred embodiment of this invention,

FIG. 2 is a perspective view of a cover plate in the embodiment of FIG. 1,

FIG. 3 is an exploded view of a distributor in the embodiment of FIG. 1,

FIGS. 4A and 4B are end views at the times when the distributor is rotated forwards and reversely, respectively, FIG. 5 is an axial sectional view of another embodiment of this invention, FIG. 6 is a perspective view of the joint part between a distributor and a plunger in the embodiment of FIG. 5, FIGS. 7A and 7B are end views at the times when the distributor in FIG. 6 is rotated forwards and reversely, respectively, FIG. 8 is a perspective view showing a modification of a part illustrated in FIG. 6, FIG. 9 is a perspective view of an end cam of a plunger in the embodiment of FIG. 5, and FIG. 10 is a sectional view taken along line X—X in FIG. 5.

First, an embodiment of this invention shown in FIGS. 1 to 4B inclusive will be described.

A pump body 1 is provided with a vertical inlet for lubricating oil 2 at a lower part thereof, and an oblique outlet 3 at an upper part thereof. An oil chamber 4 and a cylindrical chamber 5 for inserting a distributor 6 therein are formed lengthwise in the interior of the pump body 1. At one end of the body 1, a cover plate 7 is attached by screws 8. As shown in FIG. 2, the inner surface of the cover plate 7 is formed with an end cam 12. At the other end of the body 1, a driving worm 9 is inserted and disposed in a manner to extend orthogonally to the axis of the distributor 6. The worm 9 and a worm wheel 19 which is mounted on the right end of the distributor 6 engage each other. A shaft of the worm 9 is coupled with that shaft (not shown) of a prime mover or any other mechanical equipment which can rotate forwards and reversely. By rotation of the worm 9, therefore, the distributor 6 can be rotated forwards or reversely. In the illustrated embodiment, the worm wheel 19 is secured to the end of a shaft of the distributor 6 by the use of a knock pin 11. Alternatively, the worm wheel 19 may be secured by machining the end of the shaft of the distributor 6 into a letter D-shaped section and snugly fitting it into a boss hole of the worm wheel.

FIG. 3 is an exploded perspective view of the distributor 6. Formed in the center of the thick-walled cylindrical distributor 6 is a pump chamber 13, into which a plunger 15 is inserted through a spring 14. Means 20 functions so that, when the driving source is reversed, the positions of the oil inlet and outlet in the case of the forward rotation may be maintained as they are. This means 20 consists of an L-shaped lever 16 which is mounted on the fore end of the plunger 15, and an arcuate protuberance 17 which protrudes outwardly from the distributor 6. The lever 16 is disposed concentrically with the arcuate protuberance 17 so as to be permitted to turn 180 degrees.

The fore end 16a of the lever 16 lies in contact with the end cam 12 which is formed on the inner surface of the cover plate 7. Accordingly, when the distributor 6 is rotated, the plunger 15 reciprocates in the axial direction under the action of the end cam 12 and repeatedly enlarges and reduces the volume of the pump chamber 13. The protuberance 17 provided in the distributor 6 is so formed that the sum between the length of the circular outer edge of the protuberance 17 and the width of the lever 16 extends over 180°. The distributor 6 has a passage 18 which communicates the pump chamber 13 and the inlet 2, and a passage 22 which communicates the pump chamber 13 and the outlet 3. As depicted in FIG. 1, a communicating passage 21 is provided between the oil chamber 4 and the inlet 2.

Owing to the drive of the worm 9 coupled to the driving source, the distributor 6 is moved clockwise as indicated by the arrow in FIG. 4A. Then, the lever 16 is pushed by one side face 17a of the protuberance 17 and is turned in the same direction. Since the fore end 16a of the lever 16 is held in pressed contact with the end cam 12 by the spring 14, the plunger 15 is reciprocatingly moved in the axial direction by the turning of the lever 16. The volume of the chamber 13 is reduced upon the rightward movement of the plunger 15 as viewed in FIG. 1, and it is enlarged upon the leftward movement. During the stroke during which the volume of the pump chamber is enlarged, the intake passage 18 communicates with the oil inlet 2 so as to suck the lubricating oil into the pump chamber 13. On the other hand, during the stroke during which the volume is reduced, the discharge passage 22 and the oil outlet 3 communicate so as to discharge the lubricating oil. In the meantime between both the strokes, no stroke motion is carried out on account of the pressed contact of the fore lever end 16a with a flat part of the cam 12 and the communication between the pump chamber 13 and the oil inlet 2 or the oil outlet 3 is cut off by the rotation of the distributor 6, so that the pumping action is not effected. The quantity of discharge is determined by the lift of the end cam 12 as governs the stroke distance of the plunger 15.

While being pushed by the side face 17a of the protuberance 17 as shown in FIG. 4A, the lever 16 rotates one revolution clockwise. Then, the suction and discharge strokes are conducted, and the lubricating oil in a predetermined amount is supplied. When, under such a state, the rotating direction is suddenly reversed, the suction or discharge stroke is not immediately initiated. The suction or discharge stroke is initiated after a stay term of 180° reverse rotation or a phase lag of 180° is undergone until the other side face 17b of the protuberance 17 abuts against the lever 16 as illustrated in FIG. 4B. Even if the reverse rotation takes place during the forward rotation and the rotating direction of the lever 16 relative to the cam 12 changes, the oil inlet 2 communicates with the intake passage 18 during the expansion of the pump chamber 13 whereas the oil outlet 3 communicates with the discharge passage 22 during the contraction, and this positional relationship is not altered. Therefore, merely the phase lag occurs due to the momentary interruption of the pumping action in the meantime from the forward rotation to the reverse rotation, and the intake through the inlet 2 and the discharge through the outlet 3 are subsequently effected.

Another embodiment of this invention, shown in FIGS. 5 to 10, will now be described. In this aspect of performance, the stroke distance of the distributor is made variable, and the distributor is split into first and second portions, between which the maintaining means (the means 20 decribed previously) is interposed.

Referring to FIG. 5, a body 10 is provided with an inlet 2 at a lower part thereof and an outlet 3 at an upper part thereof, and it is formed with a cylindrical chamber 5 which serves to receive a distributor assembly 23 therein. A stroke adjusting mechanism 27 is disposed at a right part of the interior of the body 10, while a spring 24 normally urging the distributor towards the stroke adjusting mechanism is disposed at a left part.

The distributor assembly 23 consists of a first portion 25 and a second portion 26. The first portion 25 has at its central periphery a worm wheel 28 which engages a driving worm 29 coupled to a driving source. One end of the first portion 25 is provided with an end cam 37 which constitutes the stroke adjusting mechanism 27. The other end is provided with a projection 40 which constitutes means 20 for keeping up the functions of the inlet and outlet at the time of the forward rotation even when the driving source is reversed. Regarding the second portion 26, a pump chamber 30 is formed in the interior thereof. At one end of the second portion, an arcuate groove 38 for snugly fitting the projection 40 therein is formed. At the other end, the spring 24 is disposed. A plunger 31 inserted in the pump chamber 30 is held in pressed contact with a cover plate 42 by the spring 24 and a dish plate 32.

The stroke adjusting mechanism 27 is shown in FIGS. 5 and 10. This mechanism is constructed of a control pin 33 which is inserted in the pump body orthogonally to the axis of the distributor, a regulating lever 34 which is mounted on the end of the pin protruding outwardly of the body, a cam face in the form of an eccentric circle 35 which is formed on the control pin 33, the aforecited end cam 37 which is formed on the end face of the first distributor portion 25, and a projection 36 which is provided at the centre of the cam 37.

When the distributor assembly 23 is turned by actuation of the driving worm 29, the end cam 37 abuts against an equi-diameter surface 33a of the control pin 33 in FIG. 10, so that the distributor assembly effects one reciprocation per revolution thereof at a stroke distance equal to the lift of the end cam 37 in accordance with the profile of the end cam 37. However, when the lever 34 is turned so that the central projection 36 may abut against the cam face 35, the stroke distance at that time corresponds to an extent from the position of the central projection 36 to a position in which the top of the cam 37 (in FIG. 10) abuts against the equi-diameter portion 33a owing to the subsequent rotation of the distributor assembly. Accordingly, when the position in which the central projection 36 abuts against the cam face 35 is altered by rotating the control pin 33 with the lever 34, the stroke distance of the distributor can be adjusted (because the position in which the top of the cam 37 abuts against the equi-diameter portion 33a of the control pin 33 does not change). The stroke adjusting mechanism 27 is not restricted to the illustrated one, but it may be modified to a type in which a control pin adapted to regulate the lift from the side surface of the distributor is especially disposed.

The maintaining means 20 is illustrated in FIGS. 6, 7A and 7B, and 8. As seen from FIG. 6, the projection 40 is provided on the end face of the first portion 25, and the arcuate groove 38 is formed at the end of the second portion 26. The arc of the groove 38 has such an angle of extent that the projection 40 can move 180° from one groove end 39 to the other groove end 39a. In the state of FIG. 7A, the first portion 25 turns clockwise, and the projection 40 abuts against the one end 39 of the groove 38. In the state of FIG. 7B, the projection 40 abuts against the other end 39a owing to the counterclockwise rotation of the first portion. FIG. 8 shows a modification wherein, instead of the groove in FIG. 6, a bowed step 41 is formed at the end face of the second portion 26 so as to effect the same function.

Referring again to FIG. 5, when the distributor is rotated by the driving worm 29, a rightward and leftward reciprocating motion is bestowed on the first portion 25 under the action of the end cam 37, and it is transmitted to the second portion 26 through the projection 40 as well as the groove 38, so that the first and second portions are integrally moved. On the other hand, the plunger 31 is held in pressed contact with the cover plate 42 by the spring 24, and it does not execute any stroke movement. The internal volume of the pump chamber 30, however, is enlarged or reduced by the movement of the distributor. When the oil inlet 2 and the pump chamber 30 have mated, the distributor assembly 23 moves rightwards so as to effect the suction stroke. Upon further rotation of the distributor assembly by 180°, the oil outlet 3 and the pump chamber 30 mate, and the distributor assembly moves leftwards so as to contract the pump chamber 30 and to effect the discharge stroke.

Now, consider a case where the rotating direction is suddenly reversed during the forward rotation in the state of FIG. 7A. Then, the first portion 25 is reversely rotated, so that the projection 40 moves in reverse and runs idle 180° within the groove 38 until the projection 40 reaches the position shown in FIG. 7B. Upon abutment of the projection 40 against the other end 39a of the groove 38, the second portion 26 is reversed likewise. Here, it is supposed that the clockwise direction is the forward direction of the rotation. Then, in the end cam 37 shown in FIG. 9, a part from position b to position a corresponds to the discharge stroke, and a part from position d to position c corresponds to the suction stroke. Parts between c and b and between a and d are flat surfaces, which are ineffective to bring the distributor into the stroke motion. When the forward rotation is in the counterclockwise direction, naturally the part a–b corresponds to the suction stroke and the part c–d to the discharge stroke. It is now assumed that the clockwise rotation is reversed to the counterclockwise rotation in the part b–a. Then, while the projection 40 is running idle within the arcuate groove 38, the second portion 26 stops and the state in which the oil outlet 3 mates with the pump chamber 30 is held. Thus, only the first portion 25 rotates, and only the rotation is conducted without the horizontal movement in the part b–c. In the subsequent part c–d, the discharge of the lubricating oil is initiated and continued because the second portion 26 is kept in the state in which the outlet 3 mates with the pump chamber 30.

In case of the second embodiment, the distributor is split into the two portions. Therefore, even when the bore 5 suffers a slight offset in machining, under the influence of heat or for any other reason, the distributor can be smoothly fitted into the bore. In addition, if the second portions having different plunger diameters are prepared, the quantity of discharge can be sharply changed.

As described above, according to this invention, the positions of suction and discharge are fixed independently of the rotating direction of the distributor, and the suction and discharge of the lubricating oil can be continuously executed, so that the pump of the specified type can be made a more general-purpose one.

What we claim is:

1. A mechanical lubricating pump comprising:
   a body having an inlet and an outlet therein, said body having a cylindrical chamber defined therein;
   a driving worm in said body;
   cover plates on each end of said body;
   a rotatable distributor assembly in said cylindrical chamber, said assembly comprising:
   a first rotatable portion;
   a second rotatable portion separate from and aligned with said first portion;
   a worm wheel formed on said first portion and engagable with said driving worm;
   a pump chamber defined in said second portion;
   a stroke adjusting mechanism at one end of said first portion;
   a plunger in said pump chamber;
   a spring biasing said distributor into contact with said stroke adjusting mechanism and holding said plunger in contact with one of the cover plates;
   means mechanically transmitting the rotation of said first portion into reciprocation of said second portion relative to said plunger therein and into rotation of said second portion, said means being operable to effect feeding of a lubricating fluid into the pump chamber through the inlet and out of the pump chamber through the outlet when the distributor assembly is rotated in a first direction and when the distributor assembly is rotated in a second direction opposite to said first direction, and when the direction of rotation of the first portion is changed from one of the first and second directions to the other of the first and second directions, to resume feeding of the lubricating fluid after a delay time corresponding to an initial rotation of the first portion only of the distributor assembly through approximately 180° from the time of the change of direction of rotation, said means further comprises a projection on the other end of said first portion, and an arcuate groove in one end of said second portion, said arcuate groove having such an angle of extent that said projection can turn 180° in said groove; and
   said stroke adjusting mechanism comprises:
   a control pin in said body and extending in a direction perpendicular to said distributor assembly, said control pin having an equi-diameter portion;
   a regulating lever external of said body and fixedly secured to one end of said control pin;
   a cam face, in the form of an eccentric circle, on said control pin;
   and end cam, on one end of said first portion, abuttable with the equi-diameter portion of said control pin; and
   a central projection, at a center of said end cam, abuttable with the cam face of the control pin.

2. A mechanical lubricating pump comprising:
   a body having an inlet and an outlet therein, said body having a cylindrical chamber defined therein;
   a driving worm in said body;
   cover plates on each end of said body;
   a rotatable distributor assembly in said cylindrical chamber, said assembly comprising:
   a first rotatable portion;
   a second rotatable portion separate from and aligned with said first portion;
   a worm wheel formed on said first portion and engagable with said driving worm;
   a pump chamber defined in said second portion;
   a stroke adjusting mechanism at one end of said first portion;
   a plunger in said pump chamber;
   a spring biasing said distributor into contact with said stroke adjusting mechanism and holding said plunger in contact with one of the cover plates;
   means mechanically transmitting the rotation of said first portion into reciprocation of said second portion relative to said plunger therein and into rotation of said second portion, said means being operable to effect feeding of a lubricating fluid into the pump chamber through the inlet and out of the pump chamber through the outlet when the distributor assembly is rotated in a first direction and when the distributor assembly is rotated in a second direction opposite to said first direction, and when the direction of rotation of the first portion is changed from one of the first and second directions to the other of the first and second directions, to resume feeding of the lubricating fluid after a delay time corresponding to an initial rotation of the first portion only of the distributor assembly through approximately 180° from the time of the change of direction of rotation, said means further comprises a projection on the other end of said first portion, and a stepped part on one end of said second portion, said stepped part forming a bowed flat surface so that said projection can turn by 180°; and said stroke adjusting mechanism comprises:

a control pin in said body and extending in a direction perpendicular to said distributor assembly, said control pin having an equi-diameter portion;

a regulating lever external of said body and fixedly secured to one end of said control pin;

a cam face, in the form of an eccentric circle, on said control pin;

and end cam, on one end of said first portion, abuttable with the equi-diameter portion of said control pin; and a central projection, at a center of said end cam, abuttable with the cam face of the control pin.

* * * * *